(12) United States Patent
Takeuchi

(10) Patent No.: US 8,131,455 B2
(45) Date of Patent: Mar. 6, 2012

(54) ENGINE CONTROL APPARATUS INCLUDING COMPUTING SECTION AND A/D CONVERTING SECTION

(75) Inventor: Yoshiharu Takeuchi, Kariya (JP)

(73) Assignee: Denso Corporation, Kariya (JP)

( * ) Notice: Subject to any disclaimer, the term of this patent is extended or adjusted under 35 U.S.C. 154(b) by 457 days.

(21) Appl. No.: 12/484,533

(22) Filed: Jun. 15, 2009

(65) Prior Publication Data

US 2009/0312939 A1   Dec. 17, 2009

(30) Foreign Application Priority Data

Jun. 17, 2008   (JP) ................................. 2008-158230

(51) Int. Cl.
*G06F 19/00* (2011.01)
(52) U.S. Cl. .................. 701/114; 701/115; 123/488
(58) Field of Classification Search .......... 701/101–103, 701/110, 111, 114, 115; 123/480, 488
See application file for complete search history.

(56) References Cited

U.S. PATENT DOCUMENTS

| | | | | |
|---|---|---|---|---|
| 4,266,274 A | * | 5/1981 | Barman | 701/108 |
| 4,444,173 A | * | 4/1984 | Yamato et al. | 123/491 |
| 5,184,302 A | * | 2/1993 | Ishida et al. | 701/114 |
| 5,867,115 A | * | 2/1999 | Honda et al. | 341/120 |
| 5,991,686 A | * | 11/1999 | Oguro et al. | 701/115 |
| 6,603,287 B2 | * | 8/2003 | Morimoto et al. | 320/150 |
| 6,933,867 B2 | * | 8/2005 | Honda | 341/118 |

FOREIGN PATENT DOCUMENTS

| | | |
|---|---|---|
| JP | 05-010201 | 1/1993 |
| JP | 08-328744 | 12/1996 |
| JP | 2001-265402 | 9/2001 |
| JP | 2008-028912 | 2/2008 |
| JP | 2008-033801 | 2/2008 |

* cited by examiner

*Primary Examiner* — John Kwon
(74) *Attorney, Agent, or Firm* — Nixon & Vanderhye PC

(57) ABSTRACT

The engine control apparatus includes a computing section which performs computation for engine control in synchronization with rotation of an engine, and an A/D converter which A/D-converts an analog signal necessary for the computing section to perform the computation, the analog signal being outputted from an external device such as a knock sensor. The computing section and the A/D converter are configured to enable detection of garble in the data transmitted from the A/D converter to the computing section on the side of the computing section without affecting the operation of the A/D converter.

14 Claims, 11 Drawing Sheets

ENGINE CONTROL APPARATUS INCLUDING COMPUTING SECTION AND A/D CONVERTING SECTION

CROSS-REFERENCE TO RELATED APPLICATION

This application is related to Japanese Patent Application No. 2008-158230 filed on Jun. 17, 2008, the contents of which are hereby incorporated by reference.

BACKGROUND OF THE INVENTION

1. Field of the Invention

The present invention relates to an engine control apparatus including a computing section performing computation for engine control, and an A/D converting section converting analog signals (sensor signals, for example) into digital signals needed for the computing section to perform the computation for engine control.

2. Description of Related Art

As disclosed, for example in Japanese Patent Application Laid-open No. 2001-265402, there is known a control apparatus for vehicle use which includes a computing ECU (Electronic Control Unit) configured to read in sensor signals, and calculate control data of a given control object from the sensor signals, and a driving ECU configured to drive the control object in accordance with the control data received from the computing ECU through a communication line.

In such a control apparatus, if the control data transmitted through the communication line becomes garbled due to noise, for example, the driving ECU becomes unable to normally control the control object. Accordingly, there has been proposed an added-up value (a sum check value) is added to the end of transmission frame data on the side of the computing ECU, and the driving ECU makes a fault determination on the received transmission frame data by checking whether or not the received transmission frame data and the sum check value match each other, and discards the received transmission frame data if the check result is negative.

Generally, a control apparatus configured to read in sensor signals and perform computation for control purposes like the above computing ECU is provided with an A/D converter which converts sensor signals into digital data and sends the digital data to a computing section including a CPU of the control apparatus. However, the digital data may become garbled in a data transmission line between the A/D converter and the computing section.

Accordingly, it is desirable that the computing section makes a fault determination on the received A/D conversion results (digital data), and if the data is determined to be garbled, the computing section discards the data. This is possible by applying the fault determination process disclosed in the above patent document to the data transmission between the A/D converter and the computing section.

In this case, transmission data including A/D conversion results are added up successively on the side of the A/D converter while the transmission data are being transmitted from the A/D converter, and when all the transmission data have been transmitted, the result of the addition is transmitted as check data from the A/D converter. On the other hand, the transmission data are added up successively while they are being received on the side of the computing section, and a fault determination on the received data is made by comparing the result of this addition with the received check data.

This makes it possible to prevent the computing section from miscalculating a control amount from faulty data (garbled A/D conversion result). Meanwhile, an engine control apparatus which controls a fuel injection amount to an engine and ignition timing, etc., in synchronization with rotation of an engine needs to read in some of sensor signals in synchronization with rotation of the engine, and more precisely, needs to read in each of specific sensor signals while the engine is in a corresponding one of predetermined angular ranges.

For example, in the case where the ignition order of #1 to #4 cylinders of the engine is from #1 to #4, a signal from a first sensor is A/D-converted while the engine is between an ignition TDC position of #1 cylinder and an ignition TDC position of #2 cylinder, and a signal from a second sensor is A/D converted while the engine is between an ignition TDC position of #2 cylinder and an ignition TDC position of #3 cylinder.

When each of the sensor signals from a plurality of the sensors is A/D-converted successively when the engine is in a corresponding one of predetermined angular ranges as exemplified above, since the A/D conversion itself is carried out in synchronization with a clock signal of a fixed frequency, the number of A/D conversion results transmitted to the computing section per unit time varies depending on the rotational speed of the engine, and also the timing or time of completion of transmission of A/D conversion results varies depending on the rotational speed of the engine.

Accordingly, the above engine control apparatus cannot detect garble occurred in the A/D conversion results due to noise or the like on the side of the computing section even if the fault determination process disclosed in the above patent document is used.

In more detail, since it is not possible to determine the timing or time of completion of transmission of a set of A/D conversion results on the side of the A/D converter, because a length of a time period necessary to transmit a given number of A/D conversion results from the A/D converter to the computing section varies depending on the rotational speed of the engine, check data cannot be transmitted in proper timing within a communication time period assigned for transmission of A/D conversion results, and accordingly, it is not possible to detect garble occurred in the A/D conversion results on the side of the computing section.

It might occur that check data is transmitted each time the A/D converter performs A/D conversion. However, in this case, there occurs a problem that switch-over of sensor signals in the A/D converter is delayed, causing a timing of start of A/D conversion and also a timing of start of transmission of A/D conversion result to be delayed.

Particularly, when the rotational speed of the engine is high, and accordingly the length of a communication time interval assigned to the respective sensors is short, it becomes difficult to ensure a time sufficiently long for performing A/D-conversion and transmitting A/D conversion result, causing interruption of transmission of A/D conversion results from the A/D converter to the computing section.

SUMMARY OF THE INVENTION

The present invention provides an engine control apparatus comprising:

a computation function of performing computation for engine control in synchronization with rotation of an engine; and an A/D conversion function of A/D-converting an analog signal necessary for the first function to perform the computation, the analog signal being outputted from an external device;

the A/D conversion function being provided with a first communication function of successively transmitting A/D conversion results of the analog signal as transmission data during each of communication periods synchronized in rotation of the engine, the computation function being provided with a second communication function of receiving the transmission data transmitted from the first communication function, the A/D conversion function being further provided with a check data generation function of generating check data to detect garble present in the transmission data transmitted from the first communication function during the current communication period, and a check data transmission function of transmitting the check data as header data to the computing function during the succeeding communication period, the computation function being further provided with a determination function of determining whether the transmission data received from the A/D conversion function during the previous communication period is normal or abnormal on the basis of the check data received as the header data at the beginning of the current communication period.

According to the present invention, there is provided an engine control apparatus including an A/D converter to transmit A/D conversion results of a sensor signal or the like to its computing section, which can detect garble in the A/D conversion results on the side of the computing section without affecting the operation of the A/D converter (transmission start timings of the A/D conversion results, etc.)

Other advantages and features of the invention will become apparent from the following description including the drawings and claims.

PREFERRED EMBODIMENTS OF THE INVENTION

Figure 1:
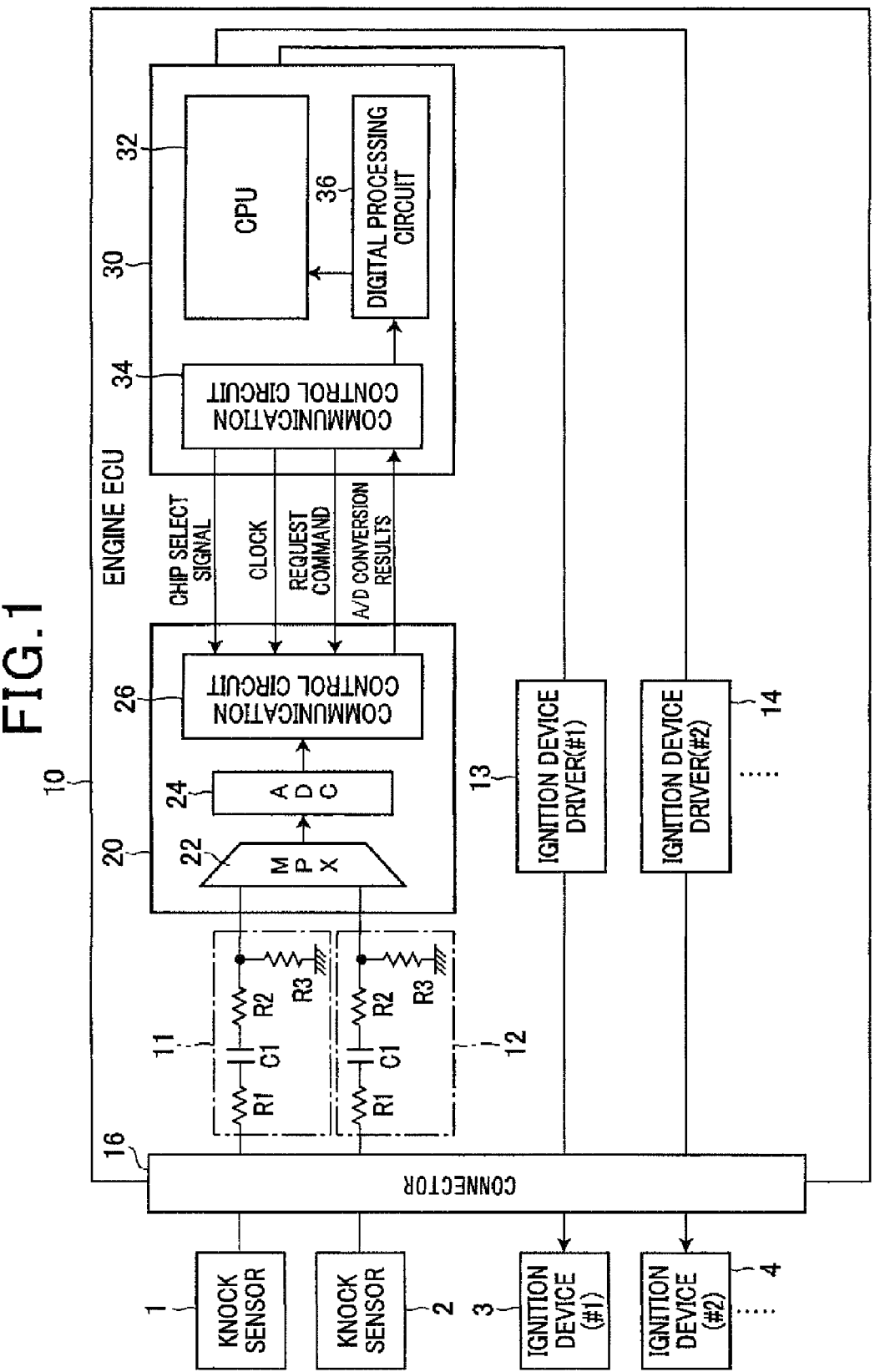
FIG. 1 is a block diagram showing an overall structure of an engine ECU according to an embodiment of the invention.

FIG. 1 is a block diagram showing the structure of a main part of an engine ECU 10 according to an embodiment of the invention.

The engine ECU 10 controls a fuel injection amount and an ignition timing for each of cylinders of an engine (not shown) in accordance with sensor signals indicative of an engine rotational speed, an intake air pressure, a throttle opening degree, a cooling water temperature, etc. outputted from various sensors (not shown) mounted on the engine. The engine ECU 10 is constituted mainly by a microcomputer 30.

In this embodiment, the engine as a control target is a V type 6-cylinder gasoline engine provided with knock sensors 1 and 2 at its left and right banks, respectively. Each of the knock sensors 1 and 2 is connected to the engine ECU 10 through a connector 16. The engine ECU 10 includes input circuits 11 and 12 for receiving the detection signals (knock signals) respectively from the knock sensors 1 and 2, and an A/D converter 20 for A/D-converting the knock signals.

The microcomputer 30 calculates an ignition timing for each of the cylinders #1 to #6 of the engine in accordance with the engine rotation speed, intake air pressure, etc., and performs ignition timing control to drive ignition devices 3 to 8 of the cylinders #1 to #6 by way of ignition output drivers 13 to 18, respectively in accordance with the calculated ignition timings. The microcomputer 30 further performs knock control to determine presence or absence of knocking on the basis of A/D conversion results (digital data) received from the A/D converter 20, and if knocking is determined to be present, suppressing knocking by delaying the ignition timings.

Each of the input circuits 11 and 12 is a circuit for passing only a necessary high frequency component of the knock signal outputted from the knock sensor 1 or 2, and blocking an unnecessary low frequency component including a DC component. Each of the input circuits 11 and 12 is constituted by a series of a resistor R1, a capacitor C1 and a resistor R2 connected between an input path of the knock signal and an input terminal of the A/D converter 20, and a resistor R3 connected between the input terminal of the A/D converter 20 and the ground.

The A/D converter 20, which is for A/D-converting a selected one of the two knock signals inputted through the input circuits 11 and 12, includes a multiplexer (may be referred to as "MPX" hereinafter) 22 for selecting one of the two knock signals, an A/D-converting circuit (may be referred to as "ADC" hereinafter) 24, and a communication control circuit 26 for transmitting a result of A/D conversion on the knock signal by the ADC 24 (may be referred to as an "A/D conversion result" or an "A/D value" hereinafter).

Figure 2:
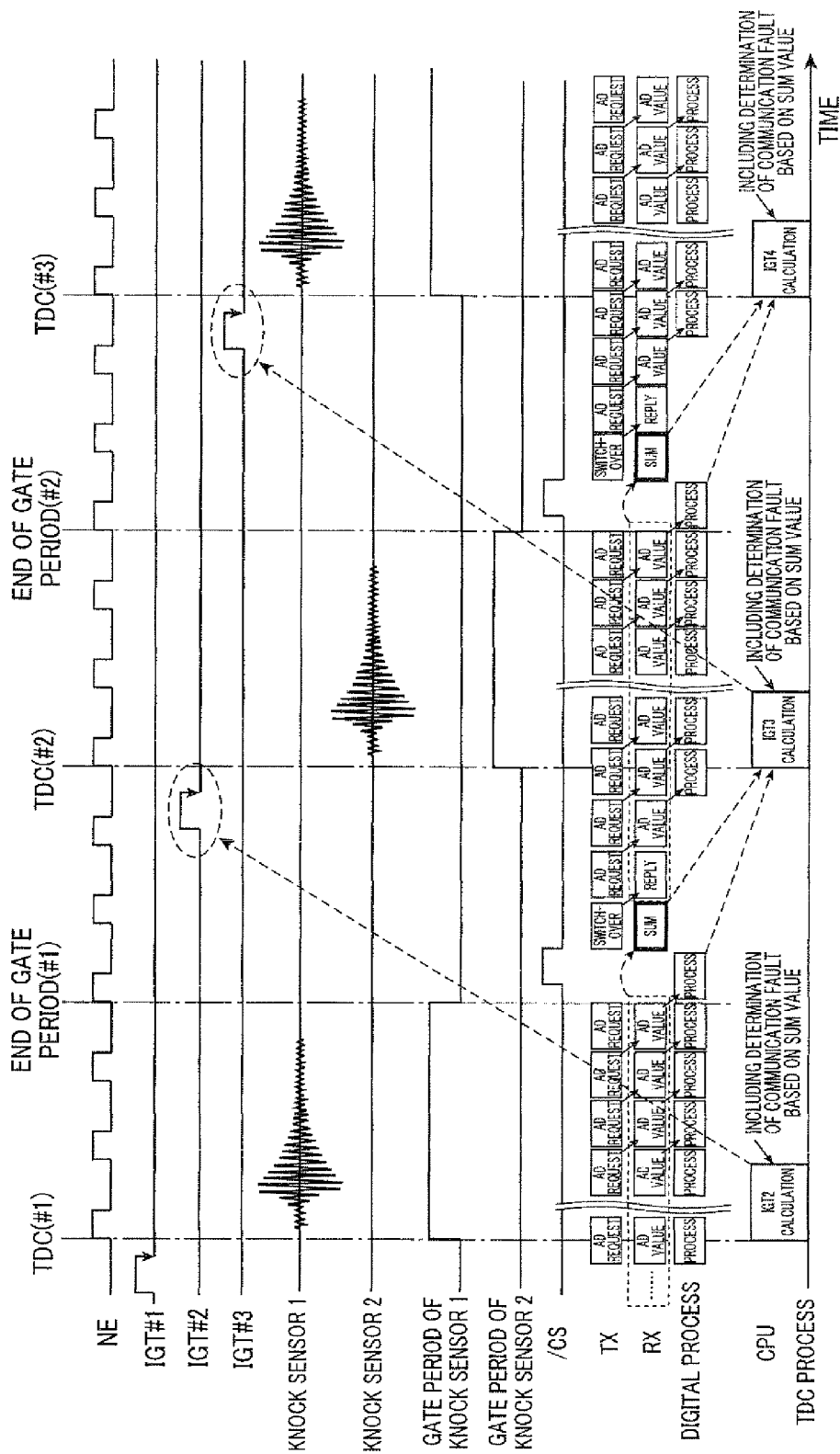
FIG. 2 is a time chart showing a communication operation between an A/D converter and a microcomputer included in the engine ECU.

The microcomputer 30 includes, in addition to the CPU 32 which executes various computation processes for engine control, a communication control circuit 34 for performing communication with the communication control circuit 26 of the A/D converter 20, and a digital processing circuit 36 which performs various digital processes (a digital-filtering process, a peak-holding process, an integrating process, etc.) on A/D values outputted from the A/D converter 20 and received by the communication circuit 34. As shown in FIG. 2, the communication control circuit 26 of the A/D converter 20 operates based on a low-active chip select signal CS and a clock signal CLK (see FIG. 5) received from the communication control circuit 34 of the microcomputer 30. The communication control circuit 26 successively receives a request command (shown by TX in FIG. 2) from the communication control circuit 34 and successively sends back reply data (shown by RX in FIG. 2) in response to the request command TX during its operating period, that is, during its communication period.

In this embodiment, the CPU 32 of the microcomputer 30 determines presence or absence of knocking on the basis of A/D values (the results of the digital processes performed by the digital processing circuit 36) obtained during a gate period between the TDC position (0° CA) and a predetermined angular position (90° CA, for example) for each of the cylinders #1 to #6. The TDC position is detected on the basis of a rotation angle signal NE outputted from a rotation angle sensor (not shown) at predetermined angular intervals (30° CA, for example) for each of the cylinders #1 to #6.

Accordingly, the communication control circuit 34 of the microcomputer 30 changes the chip select signal CS from the low level to the high level when the gate period (0° CA to 90° CA) for each of the cylinders #1 to #6 finishes to cause the A/D converter 20 to stop operation, and thereafter returns the chip select signal CS to the low level to cause the A/D converter 20 to start operation.

Immediately after the chip select signal CS is changed to the low level, a knock signal switch-over command is transmitted as the request command (shown by TX in FIG. 2) to command the MPX 22 of the A/D converter 20 to switch over the knock signal to be selected. Thereafter, an A/D request command requesting transmission of an A/D conversion result is transmitted at predetermined regular transmission timings until the gate period finishes.

The MPX 22 is configured to select the knock signal outputted from the knock sensor 1 during the gate periods of the cylinder #1, #3 and #5, and selects the knock signal outputted from the knock sensor 2 during the gate periods of the cylinder #2, #4 and #6 to enable detecting knocking occurring at each of the banks of the engine.

On the other hand, the communication control circuit 26 of the A/D converter 26 commands the MPX 22 to switch over the knock signal upon receiving a switch-over command from the communication control circuit 34 of the microcomputer 30, and sends back reply data (shown by RX in FIG. 2) indicative of the knock signal having been switched over at the next transmission timing.

The communication control circuit 26 also reads in digital data (A/D value) of the knock signal from the ADC 24 upon receiving the A/D request command from the communication control circuit 34 of the microcomputer 30, and transmits an A/D value as reply data (shown by RX in FIG. 2) at the next transmission timing.

The communication control circuit 34 of the microcomputer 30 forwards the reply data transmitted from the A/D converter 20 to the digital processing circuit 36 if it is an A/D value.

The CPU 32 executes a TDC process to calculate, at the TDC timing of each of the cylinders #1 to #6, an ignition timing IGT of one of the cylinders #1 to #6 to be fired next, and drives the ignition devices 13 to 18 in accordance with the calculated ignition timing. Incidentally, during the TUG process, there is performed the knock control in which a knock determination is made on the basis of A/D values obtained during the previous gate period, and the ignition timing is delayed when knocking has been detected to occur.

The communication control circuit 26 of the A/D converter 20 calculates a SUM value as check data used for detection of communication fault by subsequently adding up reply data in response to a switch-over command or an A/D request command, or transmission data indicative of A/D values.

Thereafter, when the chip select signal CS is changed to the low level after being changed to the high level, the SUM value calculated during the previous communication period is transmitted to the microcomputer 30 as header data.

The SUM value is compared with the sum of the data received from the A/D converter 20 during the previous communication period when the CPU 32 of the microcomputer 30 executes the TDC process in order to determine whether the received data is normal or abnormal. If the received data is determined to be abnormal, the data processed by the digital processing circuit 36 during the previous gate period are discarded, and the knock control is inhibited.

Figure 3:
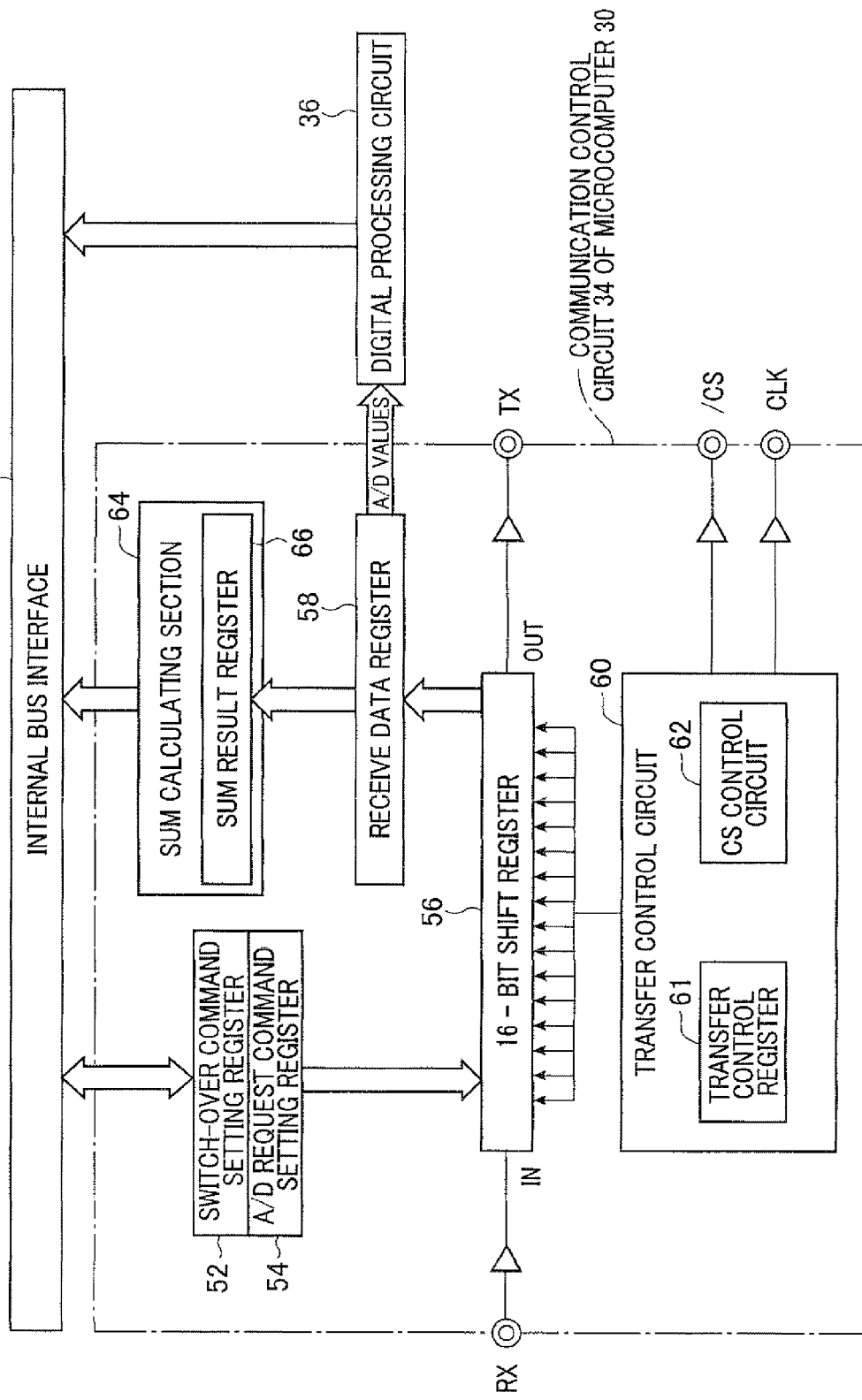
FIG. 3 is a block diagram showing a structure of a communication control circuit included in the microcomputer.

Next, the structures and operations of the communication control circuit 26 and 34 are explained in detail. FIG. 3 is a block diagram showing the structure of the communication control circuit 34 of the microcomputer 30.

As shown in FIG. 3, the communication control circuit 34 is connected to an internal bus of the CPU 32 through an internal bus interface 50 of the microcomputer 30. The communication circuit 34 includes a switch-over command setting register 52, an A/D request command setting register 54, a shift resistor 56, a receive data resistor 58, a transfer control circuit 60 including a transfer control register 61 and a CS control circuit, and a SUM calculating section 64 including a SUM result register 66. The switch-over command setting register 52 temporarily stores a switch-over command to be sent to the A/D converter 20. The A/D request command setting register 54 temporarily stores the A/D request command to be sent to the A/D converter 20. The shift register 56 transmits the request commands (the switch-over command and the A/D request command) stored in the setting registers 52 and 54 to the A/D converter 20, and receives transmission data from the A/D converter 20. The receive data register 58 reads in the received data from the shift register 56 and temporarily stores it therein. The SUM calculating section 64 reads in reply data transmitted from the A/D converter 20 (the reply data in response to a switch-over command or A/D values) from the receive data register 58, calculates its added-up value (SUM value), and stores it in the SUM result register 66. The transfer control circuit 60 controls data transfer among these registers.

The data length of request data and reply data transmitted between the microcomputer 30 and the A/D converter 20 is 16 bits, and accordingly, the shift register 56 is a 16-bit shift register.

The transfer control circuit 60, which operates on the basis of the clock signal CLK for communication use generated by an oscillator (not shown) included in the microcomputer 30, causes the switch-over command setting resistor 52 and the A/D request command setting resistor 54 to transmit various request commands stored therein to the shift resistor 56 at transmission timings spaced by a predetermined number of the clocks of the clock signal CLK.

After the transmission to the shift register 56, the transfer control circuit 60 causes the shift register 56 to operate in synchronization with the clock signal CLK, so that the request commands transferred to the shift register 56 are transmitted serially bit by bit to the A/D converter 20 through a transmission communication line (shown by TX in FIG. 3).

The transfer control circuit 60 also transmits the clock signal CLK to the A/D converter 20 through a clock transmitting line (shown by CLK in FIG. 3) while the shift register 56 operates based on the clock signal CLK to transmit request commands, so that the SUM value during the previous communication period and reply data in response to a request command are transmitted bit by bit from the communication control circuit 26 of the A/D converter 20.

A receiving terminal shown by RX in FIG. 3 to which transmission data from the A/D converter 20 are applied is connected to a serial data input of the shift register 56. Accordingly, as shown in FIG. 5, while the shift register 56 is transmitting request commands to the A/D converter 20 in synchronization with the clock signal CLK, transmission data from the A/D converter 20 are successively inputted to the shift register 56 to be subsequently stored therein.

Figure 5:
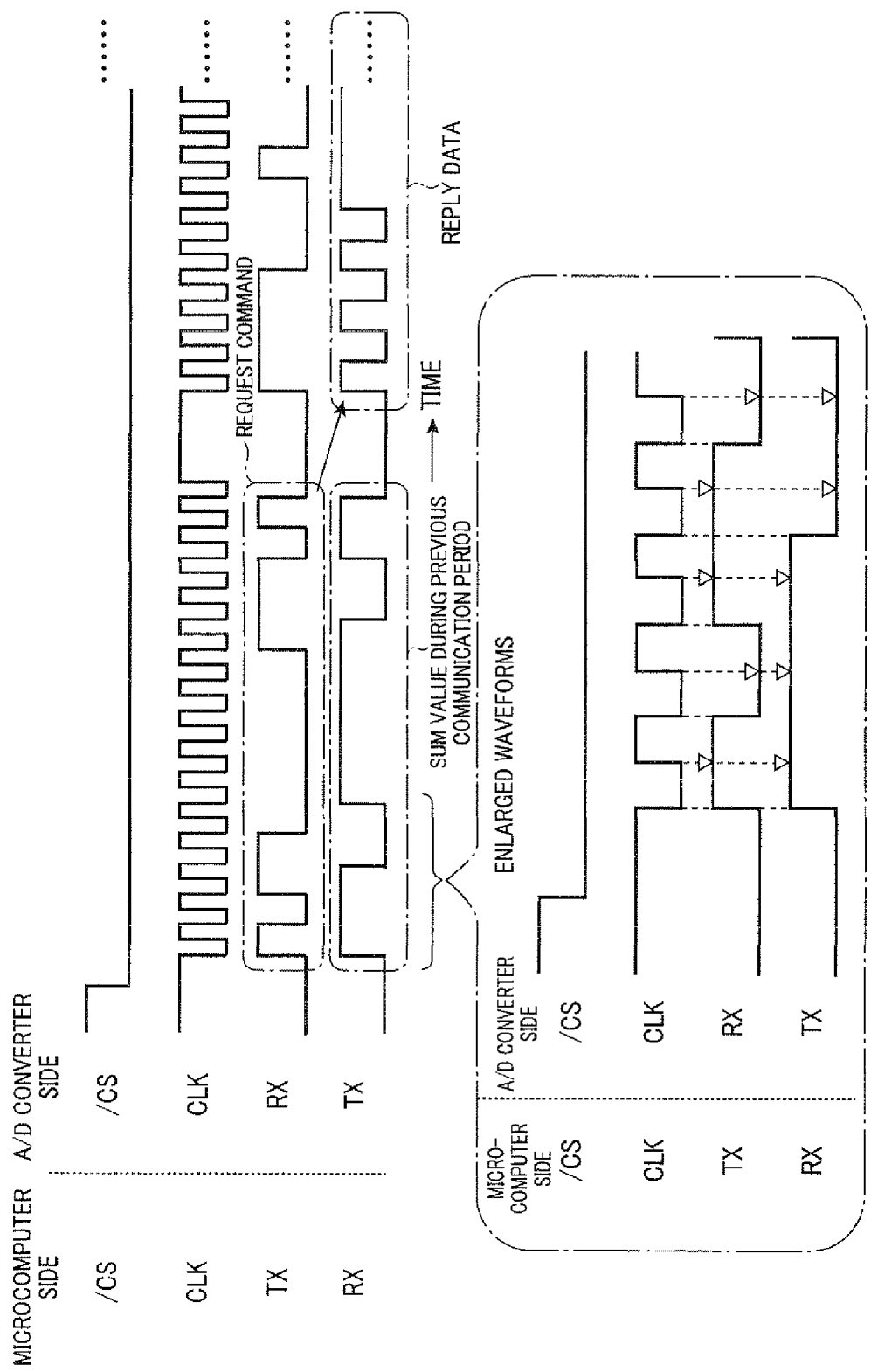
FIG. 5 is a time chart showing wave forms of signals transmitted between the communication control circuits.

As shown in the enlarged view of waveform in FIG. 5, the shift register 56 changes the level of a transmission signal (TX) in synchronization with the fall of the clock signal CLK, and latches a received signal (RX) in synchronization with the fall of the clock signal CLK.

The transfer control circuit 60 causes the shift resistor 56 to transfer received data (a SUM value or reply data) to the receive data register 58 each time data transmission per one transmission cycle (per one transmission timing) is completed to prepare for the next transmission cycle. Thereafter, the transfer control circuit 60 transfers various request commands stored in the A/D request command setting register 54 to the shift register 56.

When received data stored in the shift register 56 is the reply data in response to a request command (reply data in response to a switch-over command or A/D value), the transfer control circuit 60 transfers this reply data to the SUM calculating section 64 to calculate the SUM value of this reply data. Further, when the received data stored in the shift register 56 is an A/D value in response to the A/D request command, the transfer control circuit 60 transfers this reply data to the digital processing circuit 36 to digitally process this received data.

The kind of received data can be identified by the number of times of transmissions performed since the start of communication with the A/D converter 20. Accordingly, the transfer control circuit 60 is provided with the transfer control register 61 storing control data to perform the above transfer control in accordance with the number of times of transmissions performed.

The transfer control circuit 60 is also provided with the CS control circuit 62 for transmitting the chip select signal CS to the A/D converter 20. The CS control circuit 62 sets the chip select signal CS transmitted to the A/D converter 20 to the high level for a predetermined time period each time the gate period set in the predetermined angular range of the engine (0° CA to 90 CA for each cylinder) finishes, so that the period of time of communication with the A/D converter 20 is set in the predetermined angular range of the engine.

Figure 4:
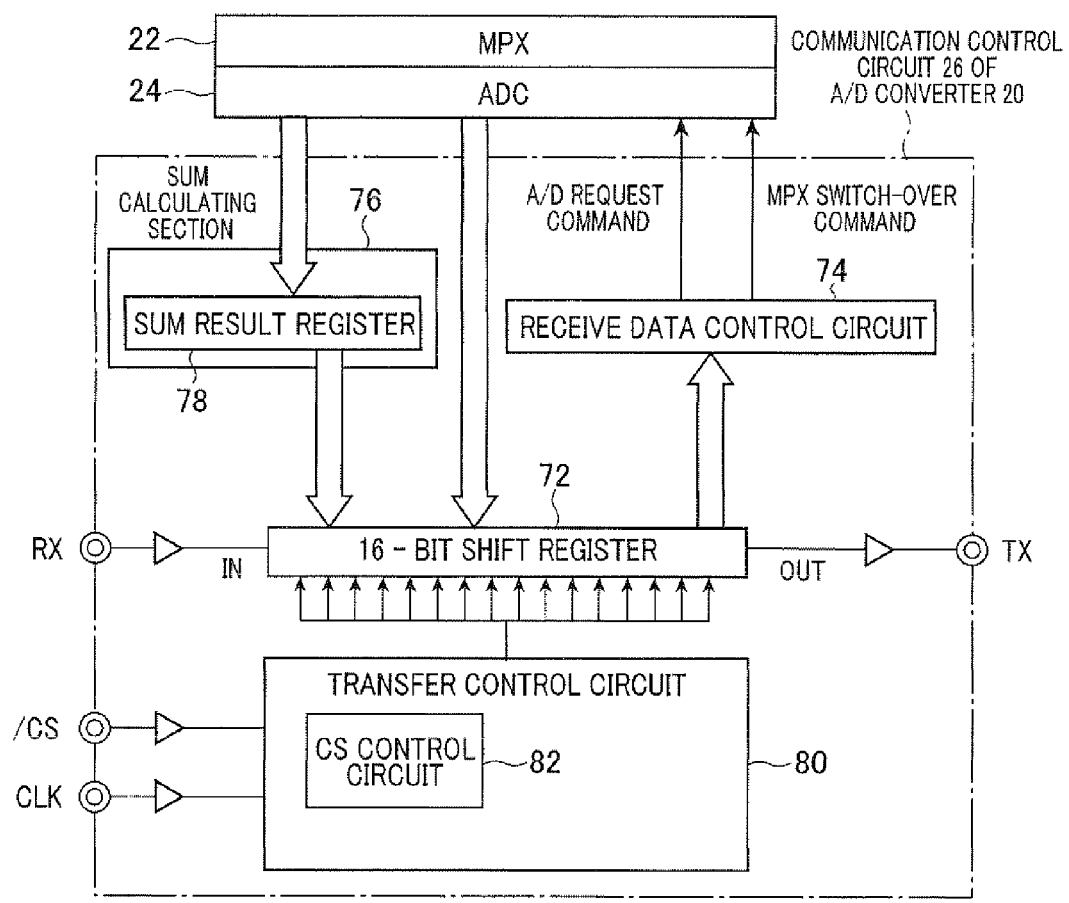
FIG. 4 is a diagram showing a structure of a communication control circuit included in the A/D converter.

The above described transfer control starts when the chip select signal CS falls, and is performed at each of regularly spaced transmission timings until the chip select signal CS rises. Next, the structure and operation of the communication control circuit 26 of the A/D converter 20 are explained. FIG. 4 is a block diagram showing the structure of the communication control circuit 26 of the A/D converter 20.

The communication circuit 26 includes a shift register 72, a receive data control circuit 74, a SUM calculating section 76 including a SUM result register 78, and a transfer control circuit 80 including a CS control circuit 82. The shift register 72 receives a request command transmitted from the microcomputer 30, and transmits an added-up value (SUM value) of reply data in response to this request command or reply data transmitted during the previous communication period to the microcomputer 30. The receive data control circuit 74 reads in received data (request command from the microcomputer 30) from the shift register 72, and outputs an MPX switch-over command or an A/D request command in response to a request command from the microcomputer 30 to the MPX 22 or ADC 24. The SUM calculating section 76 successively adds up reply data (reply data in response to a switch-over command or an A/D value) outputted from the MPX 22 or the ADC 24, and stores the added-up data (SUM value) in the SUM result register 78. The transfer control circuit 80 controls transfer of received data (request command) from the shift register 72 to the receive data control circuit 74, and transfer of a SUM value from the SUM calculating section 76.

Like the shift register 56 of the microcomputer 30, the shift register 72, which is a 16-bit shift register, changes the level of transmission signal (TX) in synchronization with the fall of the clock signal CLK, and latches received signal (RX) in synchronization with the fall of the clock signal CLK.

The transfer control circuit 80 includes the CS control circuit 82 configured to determine that a communication period with the microcomputer 30 begins when the chip select signal CS transmitted from the microcomputer 30 falls, and causes the communication operation to continue until the chip select signal CS rises.

The transfer control circuit 80 causes the SUM result register 78 of the SUM calculating section to transmit the SUM value stored therein to the shift register 72 upon being activated by the CS control circuits 82, and thereafter, causes the shift register 72 to operate based on the clock signal CLK transmitted from the microcomputer 30 so that the SUM value is transmitted from the shift register 72.

The transfer control circuit 80 initializes the SUM calculating section 76 after the SUM value is transmitted from the SUM result register 78 to the shift register 72, so that the SUM value of reply data to be transmitted from the A/D converter 20 to the microcomputer 30 during this communication period can be calculated.

Since a switch-over command is transmitted from the microcomputer 30 at the time of transmission of this SUM value, the switch-over command is stored in the shift register 72 while the SUM value is being transmitted. After completion of transmission and reception of the SUM value and switch-over command from or to the shift register 72, the transfer control circuit 80 transfers the switch-over command stored in the shift register 72 to the receive data control circuit 74.

The receive data control circuit 74 outputs a knock signal switch-over command to the MPX 22 in response to this switch-over command transferred from the shift register 72, so that the MPX 22 switches over the knock signal to be selected. This completes preparation for transmission of reply data at the next transmission timing.

When the next transmission timing comes after completion of the preparation for transmission of reply data, the clock signal CLK is transmitted again from the microcomputer 30, and accordingly, the reply data transferred to the shift register 72 is successively transferred to the microcomputer 30 in synchronization with this clock signal CLK.

When reply data is transmitted, since an A/D request command is transmitted from the microcomputer 30, a switch-over command is stored in the shift register 72. Thereafter, upon completion of transmission and reception of reply data and the A/D request command from or to the shift register 72, the transfer control circuit 80 transfers the A/D request command stored in the shift register 72 to the receive data control circuit 74.

The receive data control circuit 74 outputs an A/D value request to the ADC 24 in response to the A/D request command transferred from the shift register 72, so that the latest A/D value is transferred from the ADC 24 to the shift register 72. This completes preparation for transmission of an A/D value at the next transmission timing.

Thereafter, the transfer control circuit 80 repeats the above described operation until the chip select signal CS rises, so that A/D values and the A/D request commands are transmitted and received with the microcomputer 30.

Since the data transmitted between the A/D converter 20 and the microcomputer 30 is 16-bit data, if an added-up value of transmitted or received reply data overflows 16 bits, the SUM calculating section 76 or 64 masks the overflow portion to limit the added-up value to 16 bits. The above described embodiment of the invention provides the following advantages. As explained above, the engine ECU 10 is configured such that at the beginning of each communication period during which A/D conversion results of the knock signal (A/D values) are transmitted from the A/D converter 20 to the microcomputer 30 in synchronization with rotation of the engine, there is transmitted, as header data, a SUM value of reply data (reply data in response to a switch-over command and A/D values) transmitted during the previous communication period.

Figure 6:
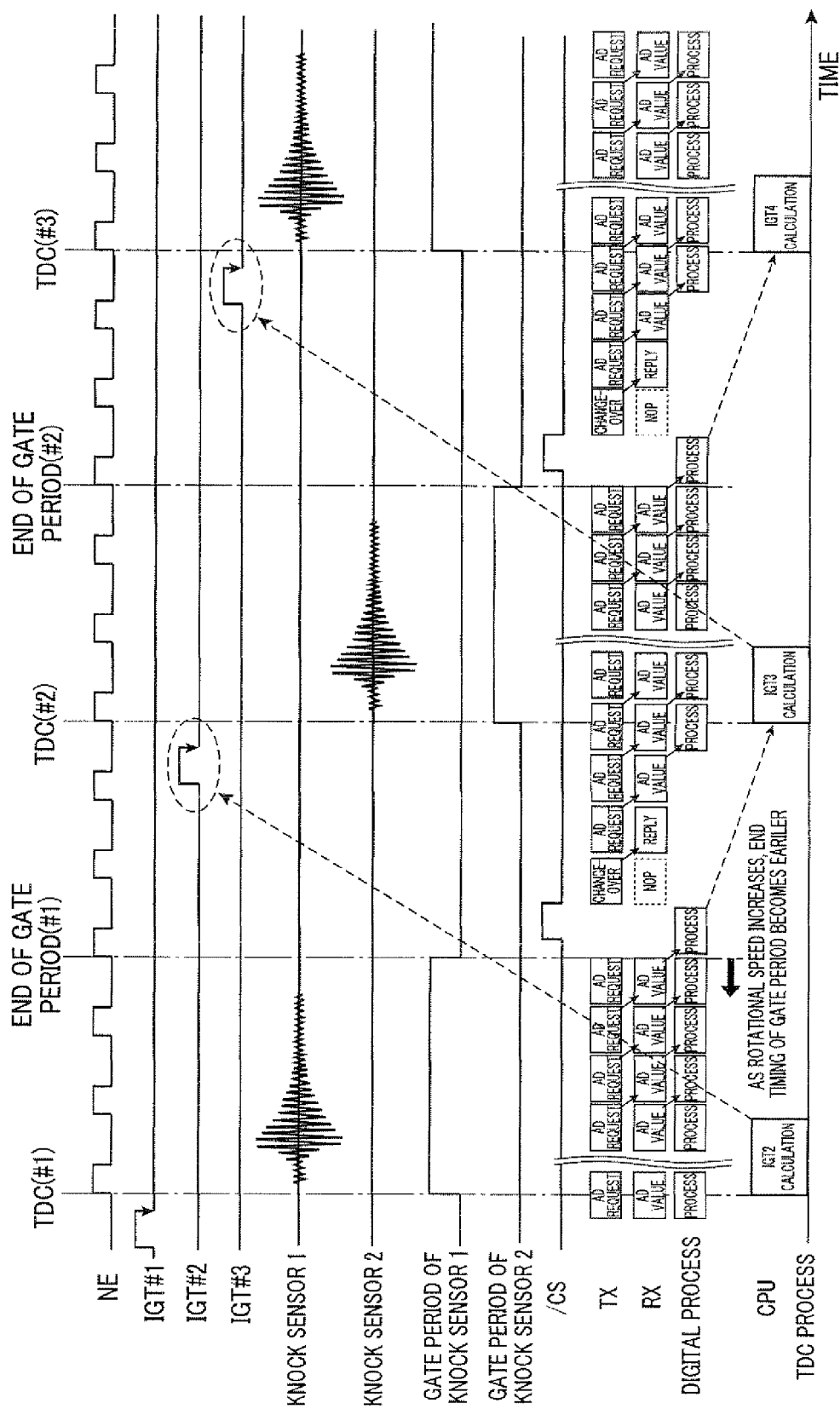
FIG. 6 is a time chart showing a communication operation between an A/D converter and a microcomputer included in a conventional engine ECU.

That is, as shown in FIG. 6, conventionally, at the beginning of each communication period, a switch-over command is transmitted as header data from the microcomputer 30 to the A/D converter 20, and empty data or NOP is transmitted from the A/D converter 20 to the microcomputer 30, whereas, in this embodiment, a SUM value is transmitted from the A/D converter 20 to the microcomputer 30 as check data at the beginning of each communication period.

Accordingly, according to this embodiment, not only it is possible to determine whether data received from the A/D converter 20 is normal or abnormal by use of its SUM value, but also to transmit a SUM value from the A/D converter 20 to the microcomputer 30 when the rotational speed of the engine increases causing the length assigned to each communication period to be considerably short.

If check data such as a SUM value is transmitted at the end of each communication period, the accuracy of knock determination may be lowered because the number of A/D values transmittable during each communication period decreases. However, in this embodiment, since the number of A/D values transmittable during each communication period does not decrease, the accuracy of knock determination is not lowered, and accordingly, the engine can be controlled with a high degree of reliability.

On the other hand, on the side of the microcomputer 30, A/D values transmitted from the A/D converter 20 are subjected to the digital processes (the digital-filtering process, peak-hold process, integration process, etc.) to extract a knock signal component used to make the knock determination. However, as shown in FIG. 7, it takes some time for the output of the digital processing circuit 36 to stabilize.

Accordingly, in the case where an analog signal (knock signals) is switched over to another one in synchronization with the rotation of an engine as is the case with this embodiment, it is desirable that the switch over is carried out promptly to start A/D conversion at an early timing to thereby stabilize the output of a digital processing circuit at an early timing.

To this end, in this embodiment, when each gate period during which the CPU 32 makes a knock determination finishes, a knock signal switch-over command is transmitted from the microcomputer 30 by turning on and off the chip select signal CS, and thereafter, A/D request commands are transmitted successively, so that the CPU 32 switches over the knock signal to be A/D converted by the A/D converter 20, and transmits A/D conversion results (A/D values) before the next gate period comes, to thereby stabilize the output of the digital processing circuit 36 at an early timing.

Figure 7:
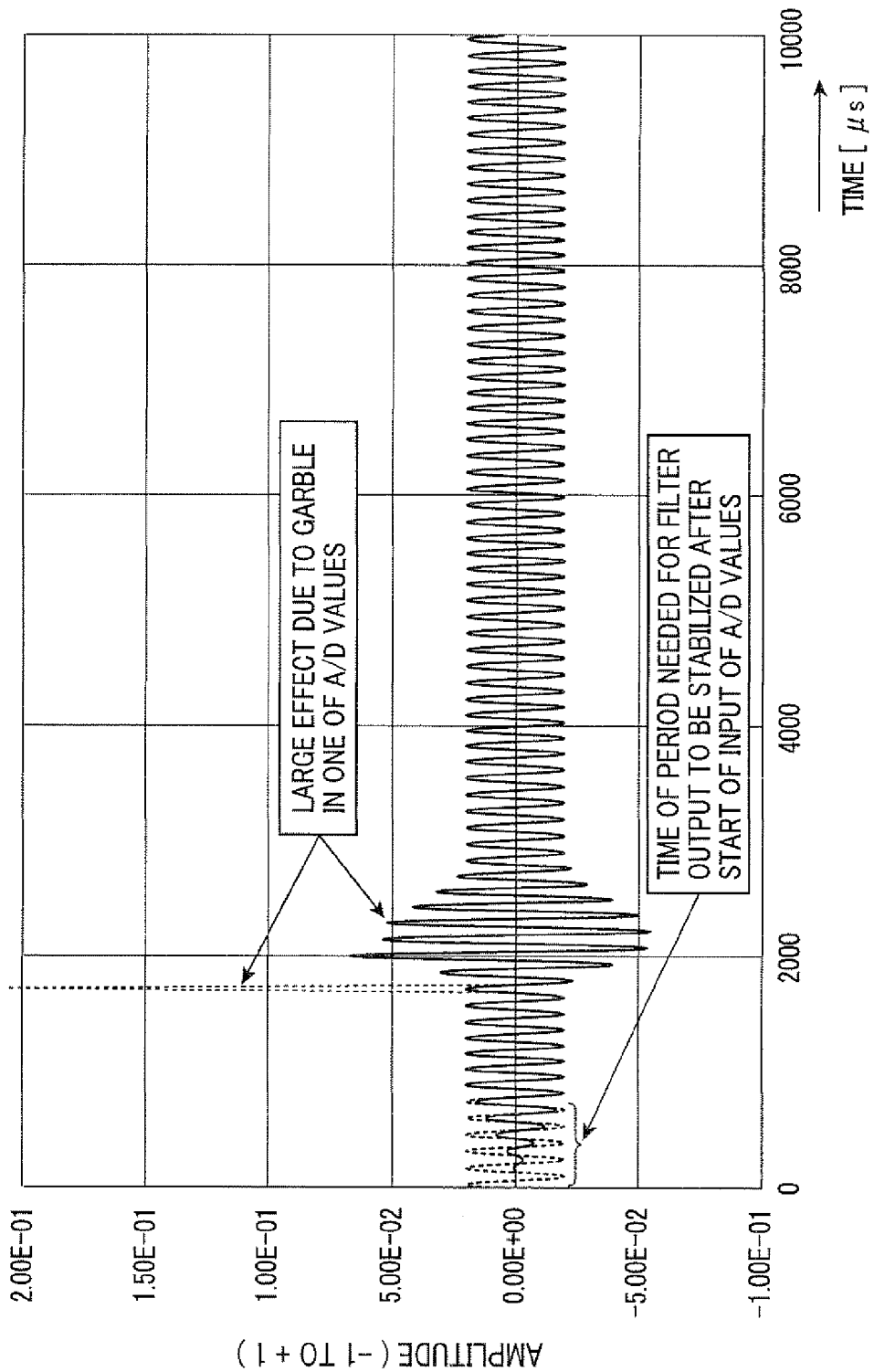
FIG. 7 is an explanatory view of a filtering operation of a digital processing circuit included in the microcomputer.

FIG. 7 is a diagram showing an example of a result of the digital-filtering process performed by the digital processing circuit 36. In FIG. 7, the dotted line shows a sine wave signal as a filter input signal with gable in one of A/D values, and the solid line shows the filter input signal after being subjected to the digital-filtering process.

As seen from FIG. 7, if there occurs a garble in the filter input signal, the result of the digital-filtering process varies greatly for a some period of time thereafter. However, this embodiment is configured such that the CPU 32 determines whether there is a fault (garble) in the data received during the previous communication period by comparing a SUM value transmitted from the A/D converter 20 with a SUM value calculated by the SUM calculating section 64, and if a fault is determined to be in the received data (A/D values) the data digitally processed by the digital processing circuit 36 during the previous gate period is discarded, and knock determination is inhibited from being made. Accordingly, according to this embodiment, it is possible to prevent making an erroneous determination of knocking when the received data (A/D values) includes a fault (garble).

In addition, in this embodiment, since the chip select signal CS is used for the microcomputer 30 to inform the A/D converter 20 of start of each communication period, it is not necessary for the microcomputer 30 to transmit a specific command requesting transmission of a SUM value from the A/D converter 20 through a dedicated communication line at the beginning of each communication period. This makes it possible to simplify the structure of the engine ECU 10.

It is a matter of course that various modifications can be made to the above described embodiment as described below.

First Modification

In the above embodiment, the CPU 32 determines whether there is a fault (garble) in the data received during the previous communication period by comparing a SUM value transmitted from the A/D converter 20 with a SUM value calculated by the SUM calculating section 64, and if a fault is determined to be in the received data (A/D values), the data digitally processed by the digital processing circuit 36 during the previous gate period is discarded, and knock determination is inhibited from being made. However, when such a fault is detected a plurality of times successively, since a fault may be in the engine itself, this fact may be indicated to inform the driver of the vehicle, and the engine may be put into a fail-safe mode.

Figure 8:
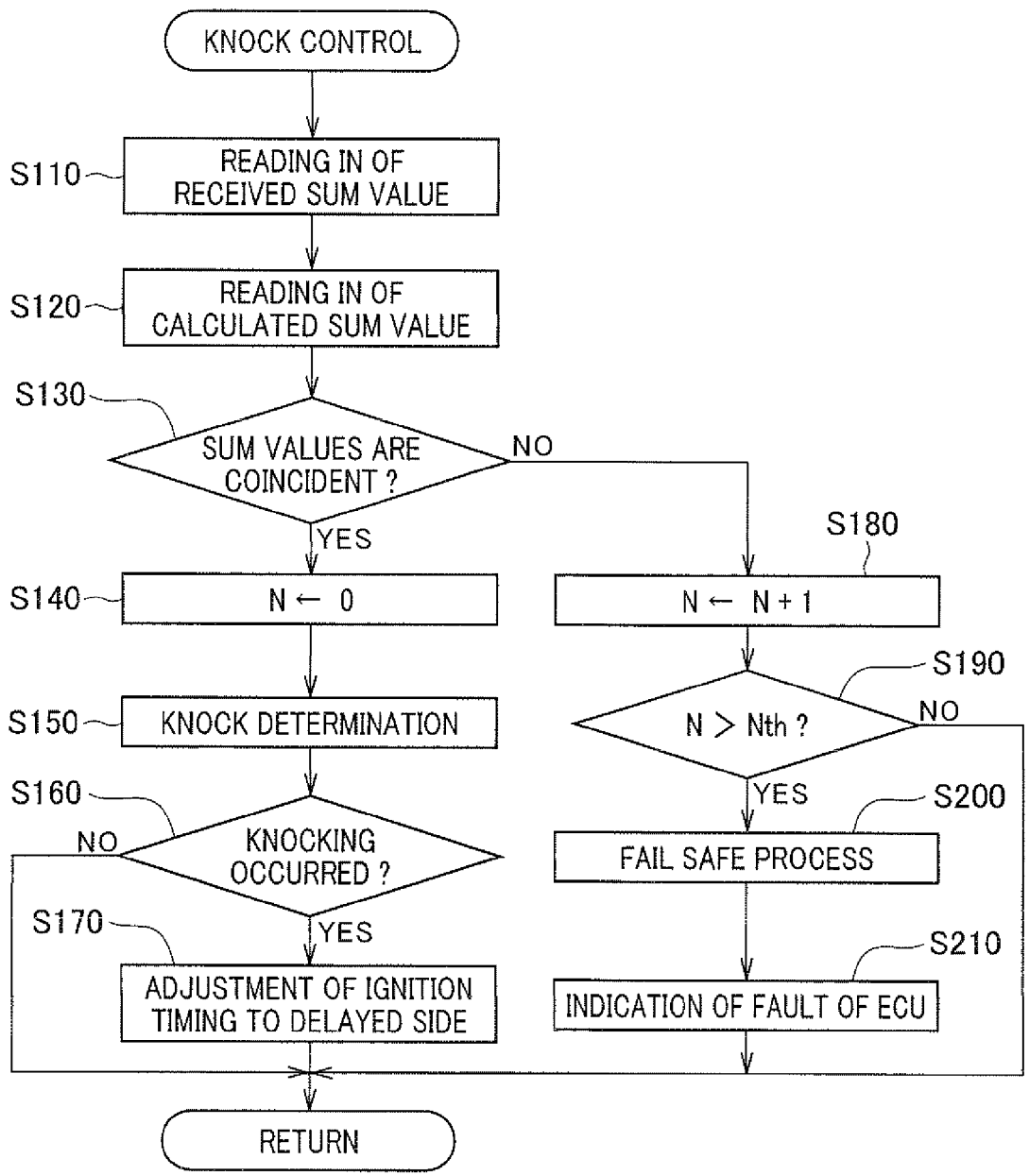
FIG. 8 is a flowchart showing a knock control performed by a microcomputer included in a first modification of the engine ECU according to the embodiment of the invention.

To do this, a knock control process shown in FIG. 8 is executed by the CPU 32. This knock control process begins by reading a SUM value received in the communication control circuit 34 at step S110. Subsequently, a SUM value of the received data calculated during the previous communication period is read in from the SUM result register 66 of the communication control circuit 34.

Next, it is determined whether or not the SUM values read in respectively at steps S120 and S120 coincide with each other at step S130. If the determination result at step S130 is affirmative, since it means that the A/D values of the knock signal received during the previous communication period (that is, the received data processed by the digital processing circuit 36) are all normal, the process proceeds to step S140.

At step S140, the count value of a fault detection counter is initialized from N to 0. Thereafter, the knock determination process is performed at step S150 on the basis of the received data processed by the digital processing circuit 36 during the previous communication period. Subsequently, it is determined at step S160 whether or not knocking has occurred on the basis of the result of the knock determination process at step S150. If the determination result at step S160 is affirmative, the process proceeds to step S170 to adjust the ignition timing of the engine toward a delayed angle side, and otherwise the knock control process is terminated.

On the other hand, if the determination result at step S130 is negative, since it means that there is a fault in at least one of the A/D values of the knock signal received during the previous communication period (that is, the received data processed by the digital processing circuit 36), the process proceeds to step 180 to increment the count value N of the fault detection counter by one.

At subsequent step S190, it is determined whether or not the count value N of the fault detection counter is larger than a predetermined threshold Nth. If the determination result at step S190 is negative, the knock control process is terminated to inhibit making a knock determination.

If the determination result at step S190 is affirmative, since it means that there is a fault in the A/D converter 20 itself, or in the communication system between the A/D converter 20 and the microcomputer 30, the process proceeds to step S200 where the CPU 32 is shifted to a fail-safe mode in which the ignition timing of the engine is set to the most delayed angle side. Subsequently, indication of the engine ECU 10 having a fault is made to the driver by lighting a fault indication lamp disposed near the driver's seat, or generating a predetermined alarm sound at step S210, and then the knock control process is terminated.

By performing the knock control process as above, if there occurs a fault in the engine ECU 10 itself, the driver of the vehicle can be advised immediately, and the engine can be shifted to a fail safe side immediately.

Second Modification

In the above described embodiment, A/D conversion results are transmitted from the A/D converter 20 to the microcomputer 30 through the communication line for serial transmission. However, A/D conversion results may be transmitted through a plurality of communication lines so that a plurality of A/D results can be transmitted at once.

Figure 9:
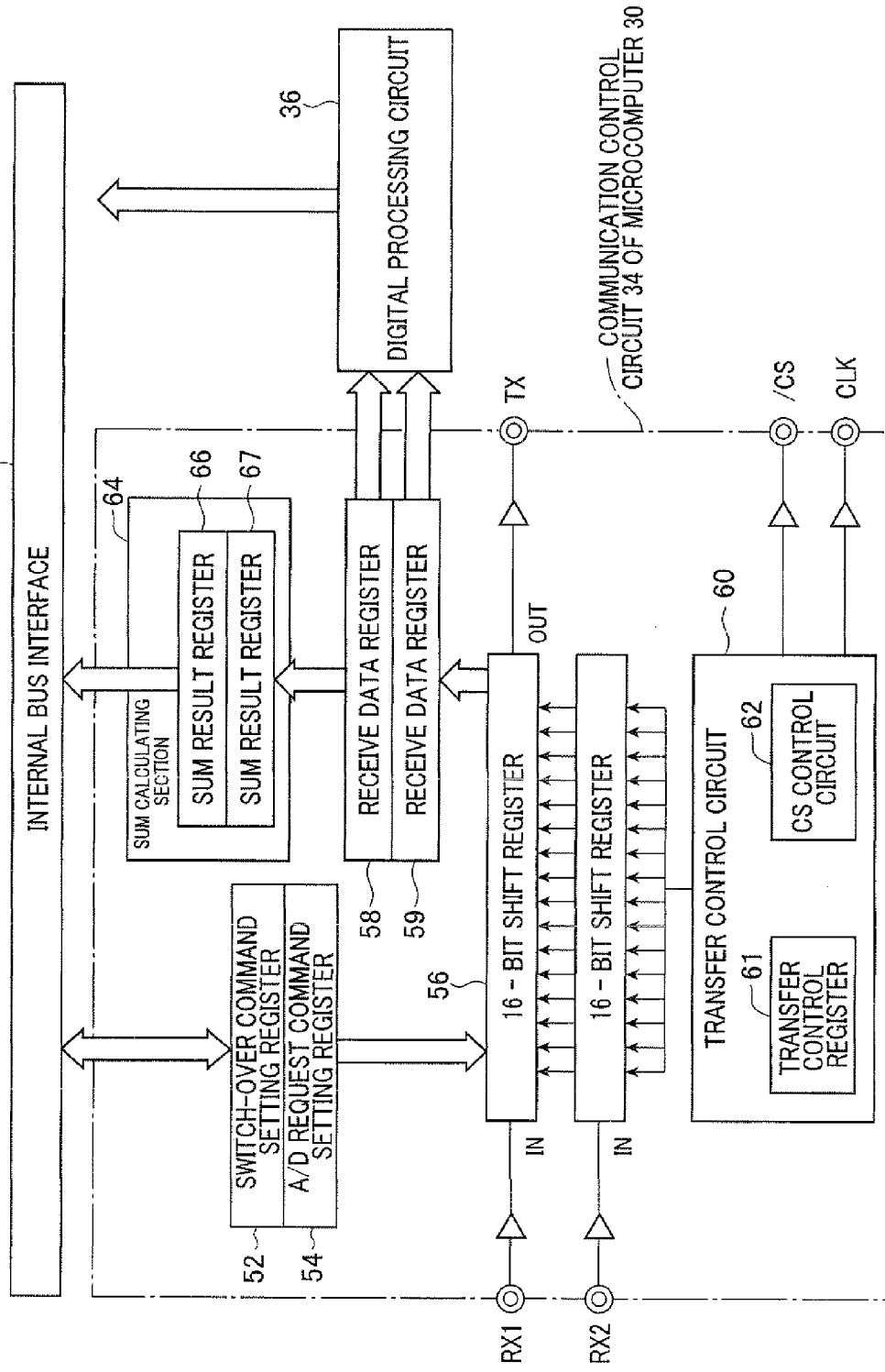
FIG. 9 is a block diagram showing a structure of a communication control circuit of a microcomputer included in a second modification of the engine ECU according to the embodiment of the invention.

For example, in this case, as shown in FIG. 9, the microcomputer 30 is provided with two shift registers 56, 57, two receive data registers 58 and 59, and two SUM result registers 66 and 67. Each of the shift registers 56 and 57 is inputted with transmission data (an A/D value) from the A/D converter 20 respectively through receiving terminals Rx1 and Rx2. The received data in the shift registers 56 and 57 are transferred to the receive data registers 58 and 59. The A/D values respectively stored in the shift registers 56 and 57 are transferred to the SUM calculating section 64 and the digital processing circuit 36 respectively.

Figure 10:
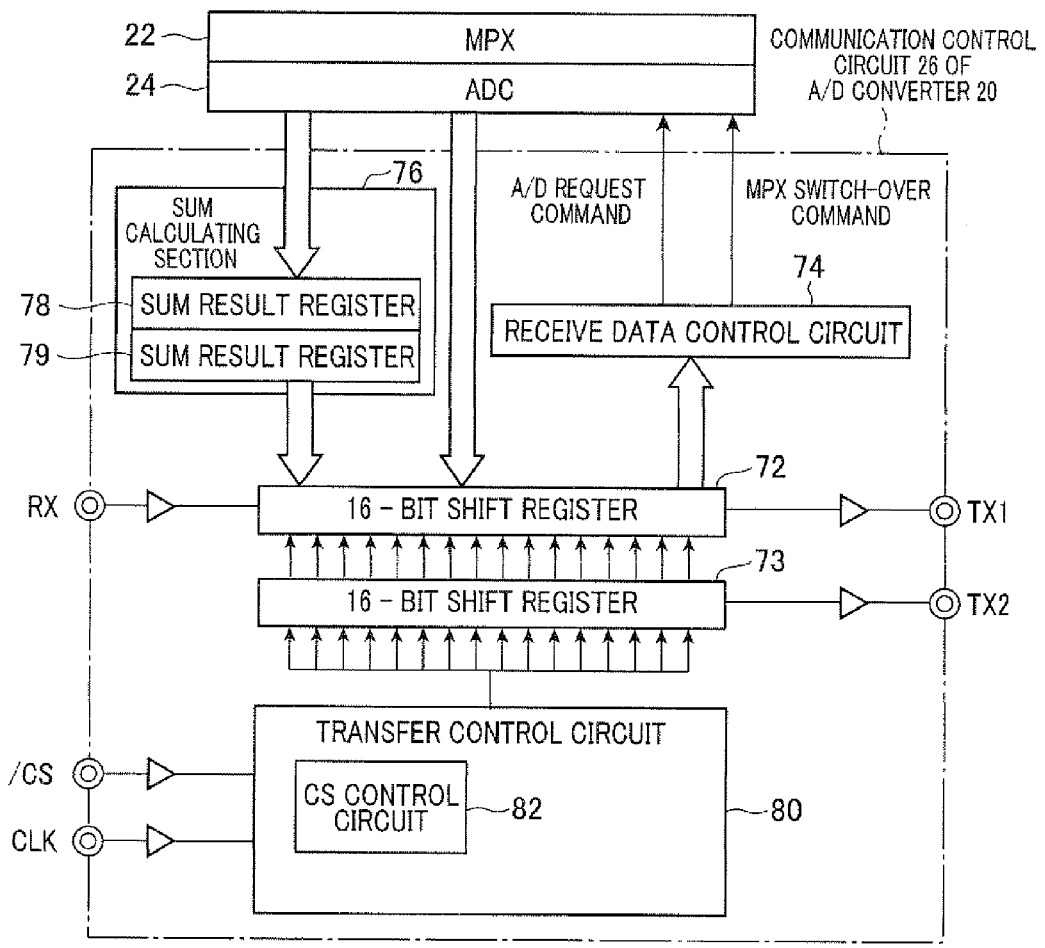
FIG. 10 is a block diagram showing a structure of a communication control circuit of an A/D converter included in the second modification of the engine ECU according to the embodiment of the invention.

Also, as shown in FIG. 10, the A/D converter 20 is provided with two shift registers 72 and 73, and two SUM result registers 78 and 49. The SUM calculating section 76 distinguishes two A/D values successively outputted from the ADC 24 as a first A/D value and a second A/D value, adds up the first and second A/D values, and stores this added-up result in the SUM result registers 78 and 79.

The two A/D values successively outputted from the ADC 24 are respectively transferred to the shift registers 72 and 73 as the first and second A/D values. The transmitting terminals TX1 and TX2 of the shift registers 72 and 73 are connected to the receiving terminals RX1 and RX2 of the microcomputer 30 through communication lines, so that the SUM values of the first and second A/D values respectively stored in the SUM result registers 78 and 79 can be transmitted as header data for each communication period.

Figure 11:
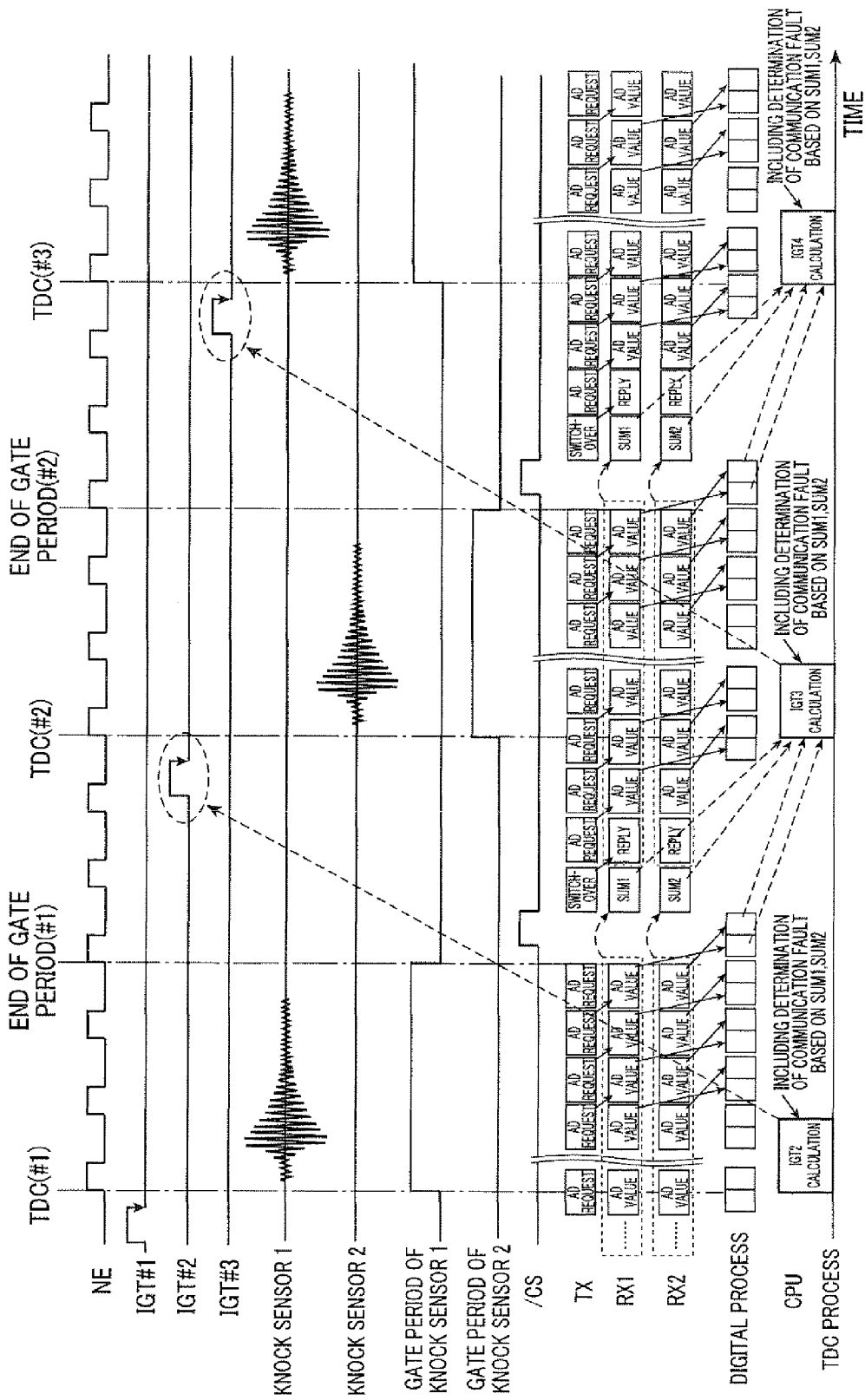
FIG. 11 is a time chart showing a communication operation between the A/D converter and the microcomputer included in the second modification of the engine ECU according to the embodiment of the invention.

According to the above structure, as shown in FIG. 11, it is possible to transmit SUM values, reply data items and A/D values two by two respectively within each transmission time period constituted of 16 clocks of the clock signal CLK, to thereby perform the digital processes and make a fault determination for each of the two A/D values. This makes it possible to increase the amount of data transmittable within each communication period.

When the frequency of the clock signal CLK is increased, radio noise which may be a cause of data garble is generated easily. By using a plurality of communication lines as explained above, robustness of data transmission can be assured, because the amount of data transmittable within each communication period can be increased without increasing the frequency of the clock signal CLK.

As an alternative way of increasing the number of A/D values transmittable from the A/D converter 20 to the microcomputer 30 within each communication period, the shift registers 72 and 56 may be replaced by communication drivers which perform bus communication to transmit data such as A/D values having a predetermined bit length through a bus.

In the above embodiment, the microcomputer 30 transmits a request command to the A/D converter 20 to cause the A/D converter 20 to transmit reply data such as A/D values to the microcomputer 30. However, the embodiment may be modified such that the microcomputer 30 transmits a chip select signal indicating that a communication period has come, and the A/D converter 20 transmits a SUM value as check data upon receiving this chip select signal and thereafter transmits A/D values at regular time intervals.

Third Modification

In the above embodiment, the SUM value of transmission data transmitted during the previous communication period is transmitted from the A/D converter 20 to the microcomputer 30 as check data. However, as the check data, a subtracted value obtained by subtracting the SUM value from a predetermined constant value, or a CRC (Cyclic Redundancy Check) sum may be used.

In the case where the subtracted value is used as the check data, even if all the bits of data received on the side of the microcomputer 30 becomes "0" due to noise, the subtracted value obtained on the side of the microcomputer 30 by subtracting an added-up value of the received data from the predetermined constant value is not "0", but equals to the predetermined constant value, the accuracy of fault detection on the side of the microcomputer 30 is high compared to the case where the SUM value is used as the check data.

In the case where a CRC check sum is used as the check data, even if one of the bits of transmission data changes from "0" to "1", and another one of the bits changes from "1" to "0", it is possible to detect fault in the transmission data on the side of the microcomputer 30, although it is impossible in the case where the SUM value is used as the check data.

To use the subtracted value or CRC check sum as the check data, the SUM calculating sections 76 and 64 respectively provided in the communication control circuit 26 of the A/D converter 30 and the communication control circuit 34 of the microcomputer 34 need to be changed to a subtraction value calculating section or a CRC check sum calculating section.

The present invention has been described by way of the preferred embodiment configured such that the A/D converter 20 transmits A/D conversion results of the knock signal to the microcomputer 30. However, the present invention is applicable to any engine control apparatus including an A/D converter which transmits A/D conversion results to its computing section including a microcomputer or the like in each communication period synchronized with rotation of an engine.

The above explained preferred embodiments are exemplary of the invention of the present application which is described solely by the claims appended below. It should be understood that modifications of the preferred embodiments may be made as would occur to one of skill in the art.

What is claimed is:

1. An engine control apparatus comprising:
a computation process means to perform computation process for engine control in synchronization with rotation of an engine; and
an A/D conversion means to take in and A/D convert an analog signal necessary for the computation process means to perform the computation process from an external device,
the A/D conversion means being provided with a first communication means to successively transmit A/D conversion results of the analog signal as transmission data to the computation process means at predetermined transmission timings during a predetermined communication period synchronized in rotation of the engine,
the computation process means being provided with a second communication means to receive the transmission data from the first communication means,
wherein
the A/D conversion means is further provided with a check data generation means to generate check data for detecting garble of the transmission data transmitted from the first communication means during the communication period, and a check data transmission means to transmit the check data as head data for the next communication period to the computation process means, and
the computation process means is provided with a determination means to determine whether or not data obtained from the A/D conversion means during the previous communication period is normal based on the check data which the second communication means has received immediately after start of the communication period.

2. The engine control apparatus according to claim 1, wherein
the A/D conversion means is provided with a signal selection means to selectively take in one of a plurality of analog signals,
the second communication means transmits a switch-over command to switch the analog signals which the signal selection means takes in as the head data immediately after start of the communication period, and
the first communication means switches the analog signals which the signal selection means takes in accordance with the switch-over command transmitted from the second communication means as the head data of the communication period.

3. The engine control apparatus according to claim 2, wherein the computation process means is provided with a digital process means to digitally process digital data which the second communication means has obtained as A/D conversion results from the first communication means.

4. The engine control apparatus according to claim 1, wherein
the second communication means successively transmits a request command including a transmission request of the A/D conversion result to the first communication means at a predetermined transmission timing, and
the first communication means, upon receiving the request command from the second communication means, transmits reply data corresponding to the request command to the second communication means at the next transmission timing.

5. The engine control apparatus according to claim 1, wherein the communication period is set as a predetermined rotational angle range of the engine.

6. The engine control apparatus according to claim 1, wherein
the computation process means is configured to set the communication period based on rotation of the engine, and transmit a chip select signal from the second communication means to the first communication means during the communication period, and
the first communication means of the A/D conversion means detects the communication period from the chip select signal, and starts transmission of the check data as the head data.

7. The engine control apparatus according to claim 1, wherein the first communication means transmits the A/D conversion results to the second communication means through bus communication.

8. The engine control apparatus according to claim 1, wherein the first communication means transmits the A/D conversion results to the second communication means through two communication lines for serial transmission.

9. The engine control apparatus according to claim 1, wherein the check data is an added-up value of the transmission data which the first communication means transmitted to the second communication means during the previous communication period.

10. The engine control apparatus according to claim 1, wherein the check data is a predetermined value minus an added-up value of the transmission data which the first communication means transmitted to the second communication means during the previous communication period.

11. The engine control apparatus according to claim 1, wherein the check data is a CRC data for cyclic redundancy check.

12. The engine control apparatus according to claim 1, wherein the A/D conversion means takes in a detection signal from a knock sensor mounted on the engine as the analog signal, and A/D-converts the detection signal.

13. The engine control apparatus according to claim 1, wherein, if data obtained from the A/D conversion means during the previous communication period is detected to be abnormal by the determination means, the computation process means discards the data obtained during the previous communication period.

14. The engine control apparatus according to claim 1, wherein, if data obtained during the communication period is detected to be abnormal by the determination means a plurality of times successively, the computation process means determines that a fault has occurred in the engine control apparatus, informs abnormality, and performs a fail-safe process to put the engine to a fail-safe side.

* * * * *